(12) United States Patent
Martinez et al.

(10) Patent No.: US 10,899,379 B2
(45) Date of Patent: Jan. 26, 2021

(54) ENERGY ABSORBING DEVICE FOR INTERNALLY COLLAPSING STEERING COLUMN ASSEMBLY

(71) Applicant: NSK LTD., Tokyo (JP)

(72) Inventors: Victor Corona Martinez, Ann Arbor, MI (US); David Ray Hartman, Brighton, MI (US); Simon Read, Dexter, MI (US)

(73) Assignee: NSK LTD., Tokyo (JP)

( * ) Notice: Subject to any disclaimer, the term of this patent is extended or adjusted under 35 U.S.C. 154(b) by 23 days.

(21) Appl. No.: 16/336,678

(22) PCT Filed: Sep. 27, 2017

(86) PCT No.: PCT/US2017/053583
§ 371 (c)(1),
(2) Date: Mar. 26, 2019

(87) PCT Pub. No.: WO2018/064088
PCT Pub. Date: Apr. 5, 2018

(65) Prior Publication Data
US 2020/0207401 A1   Jul. 2, 2020

Related U.S. Application Data

(60) Provisional application No. 62/400,254, filed on Sep. 27, 2016.

(51) Int. Cl.
*B62D 1/19* (2006.01)
*B62D 1/181* (2006.01)
*B62D 1/185* (2006.01)

(52) U.S. Cl.
CPC ............. *B62D 1/195* (2013.01); *B62D 1/181* (2013.01); *B62D 1/185* (2013.01)

(58) Field of Classification Search
CPC .......... B62D 1/181; B62D 1/185; B62D 1/19; B62D 1/192; B62D 1/195
See application file for complete search history.

(56) References Cited

U.S. PATENT DOCUMENTS 5,477,744 A   12/1995   Hoblingre et al.
5,547,221 A   8/1996   Tomaru et al.
(Continued)

FOREIGN PATENT DOCUMENTS

DE   102011083190 A1   3/2013
EP   1555188 A1   7/2005
JP   2005053349 A   3/2005

OTHER PUBLICATIONS

International Search Report and Written Opinion for International Application No. PCT/US2017/053583; dated Jan. 5, 2018.

*Primary Examiner* — Frank B Vanaman
(74) *Attorney, Agent, or Firm* — The Dobrusin Law Firm, P.C.

(57) ABSTRACT

An energy absorption strip (40) having a generally elongated body portion (46), a first end (42) and a curved portion (44) between the first end (42) and the generally elongated body (46) portion that forms and angle between the first end (42) and the generally elongated body portion (46). The energy absorption strip (40) is adapted to be carried within a steering column assembly (10) and absorb energy by plastic deformation during translation of a column tube (20) during an impact exceeding a threshold load. A steering column assembly (10) including the energy absorption strip (40) is also contemplated.

18 Claims, 2 Drawing Sheets

(56) References Cited

U.S. PATENT DOCUMENTS

| | | | |
|---|---|---|---|
| 5,690,362 | A | 11/1997 | Peitsmeier et al. |
| 5,961,146 | A | 10/1999 | Matsumoto et al. |
| 6,224,104 | B1 | 5/2001 | Hibino |
| 6,264,239 | B1 | 7/2001 | Link |
| 6,685,225 | B2 | 2/2004 | Hancock et al. |
| 7,258,365 | B2 | 8/2007 | Kahlenberg et al. |
| 7,322,610 | B2 | 1/2008 | Ishida et al. |
| 7,350,816 | B2 | 4/2008 | Ishida et al. |
| 7,410,190 | B2 | 8/2008 | Sawada et al. |
| 2005/0285383 | A1 | 12/2005 | Yae et al. |
| 2008/0023952 | A1* | 1/2008 | Manwaring ............ B62D 1/195 280/777 |
| 2012/0193902 | A1* | 8/2012 | Akutsu .................. B62D 1/195 280/777 |
| 2012/0266716 | A1* | 10/2012 | Sulser ................... B62D 1/184 74/493 |
| 2013/0233117 | A1 | 9/2013 | Read et al. |
| 2015/0375773 | A1* | 12/2015 | Tinnin ................... B62D 1/195 74/493 |
| 2017/0247047 | A1* | 8/2017 | Strong .................. B62D 1/187 |

\* cited by examiner

ENERGY ABSORBING DEVICE FOR INTERNALLY COLLAPSING STEERING COLUMN ASSEMBLY

FIELD OF THE INVENTION

In general, the present teachings relate to an improved collapsible steering column assembly and methods associated with the same (e.g., methods of providing energy absorption, such as in a secondary impact). More particularly, though having aspects making it adaptable to external collapsing column systems, the present teachings are directed mainly at an internal collapsing tilt and motorized telescopically adjustable steering column system.

BACKGROUND

In the field of automotive vehicles it has become popular to employ steering column assemblies that include tilt and telescoping functions, such assemblies being known also as "rake and reach" steering column assemblies. The use of motors to translate a steering wheel relative to a vehicle operator also has seen increased use.

During a vehicle collision, there are commonly two impacts. In a primary impact, the vehicle impacts another object. In a secondary impact, a vehicle occupant impacts a component of the vehicle. For example, a vehicle operator sometimes impacts the steering wheel due to inertia. In order to protect drivers from such secondary impacts, it has become common practice to use an impact-absorbing type steering column.

The structure of an impact-absorbing type steering column apparatus is such that when the driver suffers a secondary impact, the impact energy acts on the steering column in the frontward direction of the vehicle. The steering column may detach from one or more fixation points with the vehicle body and move forward (e.g., in a collapse stroke), so that the impact energy is absorbed in the course of the collapse stroke. An external collapsing column assembly is an example of a system in which the entire column will translate relative to its fixation points. An internal collapsing column assembly typically will be fixed at one or more fixation points near one of the ends of the assembly within the vehicle. During a collapse stroke from a secondary impact, components of the assembly will longitudinally collapse (e.g., generally within the volume it occupies within the vehicle in normal operation; that is, generally within its "footprint" in the vehicle), but generally will not collapse beyond a certain distance relative to a predetermined fixation point. An internal collapsing system thus has a stroke, but will remain fixed to the vehicle at the one or more fixation points.

For many applications, steering column assemblies incorporate both tilt and telescopic functions. For these, it is common to employ motors to perform each function. For example, one motor may be operated to actuate the steering column assembly generally in an upward or downward vertical direction to adjust the height of a steering wheel relative to an operator of the vehicle and thus perform the tilt function. Another motor may be operated to actuate the steering column assembly to adjust the fore/aft position of the steering wheel relative to the vehicle operator. The latter typically achieves the adjustment by way of translation of a telescopic tubing arrangement by which at least one tube associated with the steering wheel translates relative to a shaft for steering.

For improving upon existing collapsible steering column assemblies (and especially internal collapsing systems), as compared with typical existing systems, it is desired for an acceptable solution to include some or all advantages as compared with existing assemblies, such as reduced weight, reduced number of components, reduced "footprint", a collapse stroke of at least about 70 mm (e.g., about 80 to 100 mm or more), or a structural platform that allows tunability and/or variability to allow the use of common parts to meet differing performance specifications for different vehicles, but otherwise requires minimal hardware substitution.

The following U.S. patent documents may be related to the present invention: U.S. Pat. No. 5,547,221; 5,690,362; 5,961,146, 6,264,239; 6,224,104; 5,477,744; 7,322,610; 7,350,816; 6,685,225; 7,410,190; and 7,258,365, and U.S. Publication No. 2013/0233117, all of which are incorporated by reference herein for all purposes. European Publication No. EP 1555188A1 also may have teachings related to the present invention and is incorporated by reference herein.

SUMMARY

The present teachings make use of a simple, yet elegant, construction approach by which relatively few components can be employed for achieving an adjustable steering column assembly (and particularly an internally collapsing assembly) that exhibits good energy absorption characteristics, especially during a secondary impact.

In general, the present teachings make use of a steering column arrangement in which there is included a housing (typically made of metal, such as aluminum, which may be cast) adapted for attaching to a structure (e.g., a cross car beam, instrument panel or both) of an automotive vehicle. A displaceable inner tube is configured to receive a steering shaft. A telescoping actuator device (which may be a part of a telescoping motor assembly), such as an electric motor, is operatively attached to the housing and to the inner tube by way of one or more drive members (e.g., a rod) in a manner that allows the inner tube to be actuated selectively in a fore or aft direction by a vehicle operator. The assembly is also such that it allows the column tube to translate forward into the housing, in a controlled manner using one or more energy absorption device elements, which elements may be selected on the basis of a particular vehicle application, and may be designed for varying or tuning the desired response (e.g., timing of detachment and/or plastic deformation during a collapse stroke). During a secondary impact event the force of the impact by the vehicle operator is thus transmitted through by the steering shaft to the column tube. Additional energy from the impact is absorbed by one or more energy absorption elements that are situated relative to (e.g., operatively between) the telescoping motor assembly and the column tube, the housing or both. The one or more energy absorption device elements are configured (e.g., as a generally thin strip that is capable of plastically deforming) and the material selected (e.g., a plain carbon steel, a steel alloyed with one or more other metals, or some other steel or metal) so that they plastically deform to absorb impact energy. Such plastic deformation may be deformation in the absence of elongation; thus it is possible that the strip may become folded upon itself and be constrained so that it either gets pulled around an edge of a structure (e.g., a guide structure) or pushed forward by the column tube causing the deformation. The energy absorption of the one or more energy absorption device elements occurs as energy from the load is primarily absorbed by way of deformation (including plastic deformation) of the energy absorption device elements.

Without intending to be limited by the following, in one aspect, the teachings herein make use of a unique energy absorption strip and combination of components defining a steering column assembly. The present teachings contemplate an energy absorption strip. The energy absorption strip may include a generally elongated body portion. The energy absorption strip may include a first end. The generally elongated body portion may include a curved portion between the first end and the generally elongated body portion that forms an angle between the first end and the generally elongated body portion. The energy absorption strip may be adapted to be carried within a steering column assembly and absorb energy by plastic deformation during translation of a column tube during an impact exceeding a threshold load (e.g., during a collapse stroke). The energy absorption device may include a T-shape at the first end that may be adapted to engage with a column tube (e.g., a notch or opening of a column tube) or a plate stop of the steering column assembly. The energy absorption strip may be in a generally unwrapped state (e.g., not forming a U-shape). The angle formed between the first end and the generally elongated first portion may be about 90 degrees±about 10 degrees. The energy absorption strip may be adapted to be folded over itself during translation of a column tube during the impact. The energy absorption strip may be a metal strip.

The present teachings also envision an adjustable steering column assembly. The adjustable steering column assembly may include a column tube and a steering shaft supported for rotation at least in part by the column tube and having a longitudinal axis. The steering column assembly may further include a telescoping motor subassembly adapted for selectively driving the steering shaft, the column tube, or both, in a fore or aft direction generally along the longitudinal axis. The steering column assembly may also include an energy absorption strip, as discussed herein. The energy absorption strip may be deformed as a result of the translation of the column tube (e.g., in a forward direction) during the impact exceeding the threshold load. The telescoping motor subassembly may remain generally fixed during the impact. For example, during an impact and/or a collapse stroke, only the column tube and/or the steering shaft and the energy absorption device may move. The steering column assembly may further comprise a tilt subassembly that may be adapted for selectively raising or lowering the steering shaft, the column tube, or both. The first end of the energy absorption strip may be received within the column tube. The T-shape of the first end of the energy absorption strip may engage with a notch of the column tube to retain the first end of the energy absorption strip within the column tube. The deformation of the energy absorption strip may be guided by a guide structure around which the energy absorption strip wraps during the impact. The guide structure may be formed of a material that provides a consistent coefficient of friction and/or has sufficient compressive strength that does not break (but may yield) when the energy absorption strip wraps around the guide structure. The elongated body portion of the energy absorption strip may be located within the column tube. The first end may extend out of the column tube and may be secured to a plate stop within the assembly. The plate stop may be attached to the column tube. During an impact, the plate stop may shear off the column tube. The first end of the energy absorption strip may remain secured to the plate stop, which may cause the elongated body portion to deform.

As will be gleaned from the teachings herein, it is thus possible to realize a unique assembly (and associated methods) that enable a steering column assembly to absorb energy during a secondary impact vehicle collision, wherein the internal collapse of the column is in a significantly smaller packaging envelope, while also providing adjustable driving positions.

DETAILED DESCRIPTION

As required, detailed embodiments of the present teachings are disclosed herein; however, it is to be understood that the disclosed embodiments are merely exemplary of the teachings that may be embodied in various and alternative forms. The figures are not necessarily to scale; some features may be exaggerated or minimized or even omitted to show details of particular components. Therefore, specific structural and functional details disclosed herein are not to be interpreted as limiting, but merely as a representative basis for teaching one skilled in the art to variously employ the present invention.

In general, the teachings herein are directed toward a unique combination of components for a collapsible steering column assembly, and more particularly an internally collapsing steering column assembly for vehicles that have a motorized telescoping functionality. By use of the teachings herein, it is possible to achieve a full collapse stroke of about 70 mm or more, about 80 mm or more, or about 100 mm or more. The assemblies also make possible a reduced weight system as compared with many other systems in view of the relative simplicity of design. For example, the teachings herein contemplate integrating functions of mounting within a vehicle and accommodating tilt of a column housing with a single component, thereby reducing the number of components and also providing an overall reduced "footprint". The teachings herein also provide a structural platform that allows the use of common parts to meet differing performance specifications for different vehicles, but otherwise requires minimal hardware substitution. That is, like assemblies can be used across a range of vehicles, and can be individually tuned (e.g., by selection of an appropriate energy absorption device to meet the unique requirements of a particular vehicle).

With more attention now to the details of the assemblies herein, they generally will include a tube that is operatively connected with a steering wheel, e.g., via a steering shaft. One such tube, referred to herein as a column tube, typically will have a hollow cavity along at least a portion of (if not the entirety of) the length of the tube and may be sized and configured to receive and support a rotatable shaft, namely a steering shaft and possibly one or more bearings. Both the shaft and the tube will have a longitudinal axis. When installed in a vehicle, the longitudinal axis of each the shaft and the tube may be generally coaxially aligned, aligned generally parallel with a longitudinal axis of a vehicle, or each. The shaft and the column tube typically will be made of a suitable metal, such as steel or aluminum.

A bracket structure may be employed for receiving at least a portion of the steering shaft and for mounting the steering column assembly within the automotive vehicle. The bracket structure may include a single unitary structure, or a plurality of components assembled together in an assembly to define a bracket structure. The bracket may be a cast structure (e.g., structure made by a casting cast), a forged structure (e.g., a structure made by forging a metal mass), a machined structure, a consolidated structure (e.g., a structure made by a step of sintering and/or pressing a powder metal mass) or any combination thereof. For example, one approach is to cast the bracket structure to form an aluminum alloy casting. The bracket structure may be configured for integrating functions of mounting within a vehicle and accommodating a tilt function of the assembly relative to a vehicle operator.

The bracket structure may include a plurality of ribs. It may include one or more openings through which a fastener may be passed for attaching the bracket to the vehicle. It may include one or more projections, such as for attaching to the vehicle. The bracket structure may include an upper surface, at least a portion of which is adapted to abut against the automotive vehicle structure to which it is attached. For example, for attaching to a generally flat cross vehicle beam, instrument panel or both, which is to be disposed above the top bracket, the bracket structure may include a generally planar upper surface. Of course, as seen in the drawings, the generally planar upper surface may include one or more wells at least partially defined by the ribs that are present. The bracket structure may also include a collar portion that projects away from a lower surface of the bracket. The collar portion may be defined to include a completely closed or at least partially enclosed structure against which the column tube may abut. The bracket structure may include one or more (e.g., a pair of) pivotal connection arms. For example, at least one pair of arms may be disposed toward a forward end of the top bracket. The arms may include a portion that extends beyond a forward end of the upper surface. The arms may include one or more openings for receiving a fastener that penetrates through the arm and into a column housing. The bracket structure may also include a housing structure, a flange structure or both for receiving a motorized tilt subassembly, a telescoping motor subassembly, an energy absorption device or any combination thereof. The collar portion may have an asymmetric structure, such as that depicted herein as resembling a capital letter "D", within which one or more components (e.g., a drive member such as a rod) of a motorized tilt subassembly are received. It may also be "u"-shaped or otherwise configured.

The teachings contemplate employing at least one telescoping motor subassembly adapted for selectively driving the steering shaft (by way of a rod or other drive member) in a fore or aft direction generally along the longitudinal axis of the steering shaft. The telescoping motor subassembly may include an electric motor that has a motor shaft that operatively drives a drive member (e.g., a rod that is threaded or has gear teeth over at least a portion of its length). The shaft may drive the drive member by use of one or more gears. It may drive the drive member by way of a threaded nut. The motor shaft may have a longitudinal axis that is oriented generally parallel with the longitudinal axis of the steering shaft and/or column tube. The motor shaft may have a longitudinal axis that is oriented generally transverse with the longitudinal axis of the steering shaft and/or column tube. The telescoping motor subassembly may be such that it includes a housing within which the motor is at least partially located. The housing may include one or more flat surfaces that are adapted to slidingly bear against another surface (e.g., a bracket, a flange of the column housing, or some other mounting structure), which other surface may be part of, or be operably connected with the column housing. Such flat surfaces may be a part of a mounting structure for securing the telescoping motor subassembly to the overall assembly.

The teachings further contemplate employing at least one tilt subassembly that is adapted for selectively raising or lowering the steering shaft. The optional tilt subassembly may be manually actuated, motorized or both. It may be attached (e.g., at a first mount location along its length) to the bracket structure. The tilt subassembly may be at least partially incorporated within the column housing.

As indicated, a column housing is pivotally coupled with the top bracket (e.g., at a forward end of both the top bracket and the column housing) and is adapted to permit steering shaft adjustment (e.g., tilt adjustment, telescopic adjustment or both, such as by way of the tilt subassembly, the telescoping motor subassembly, or both). The column housing may be a cast structure (e.g., a structure made by a casting cast), a forged structure (e.g., a structure made by forging a metal mass), a machined structure, a consolidated structure (e.g., a structure made by a step of sintering and/or pressing a powder metal mass) or any combination thereof. One approach is to cast the column housing to form an aluminum alloy casting. The column housing may include one or more ribs. It may include a structure (e.g., along a side of the housing so that it projects generally radially outward relative to a longitudinal axis of the housing) onto which an energy absorption device of the teachings herein may be secured, or into which an energy absorption device of the teachings herein may be positioned. For example, the column housing may be generally elongated. It may have a substantially cylindrical configuration. It may have a lower portion that has laterally projecting flanges over at least a portion of the column housing length. The flanges may project from both sides of the column housing. The flanges may project laterally outward to a location that extends beyond the outermost reach of the wall from which it projects. The column housing may have one or more openings, e.g., slots, in a lower portion for exposing the column tube so that the column tube can be connected with and translate longitudinally with a drive member (e.g., via a suitable bracket) associated with a telescoping motor subassembly. Because the column housing is pivotally connected to a bracket structure (e.g., at a forward end of the assembly), in the event of a secondary collision, the column housing will remain generally fixed in its normal operational position.

The teachings contemplate further employing a telescoping motor subassembly mounting structure that is coupled during normal operation to the column housing, the telescoping motor subassembly and the inner column tube. The telescoping motor subassembly mounting structure may be at least partially integrated with a housing for a motor that forms part of the telescoping motor subassembly mounting structure. The telescoping motor subassembly mounting structure may include an upper portion that has one or more flat surfaces that oppose a bottom surface of the column housing. For example, the telescoping motor subassembly mounting structure may be at least partially integrated with the telescoping motor subassembly (e.g., as part of a motor housing).

By way of illustration, the telescoping motor subassembly mounting structure may be employed with one or more bolts for securing the telescoping motor subassembly relative to the column housing.

The telescoping motor sub-assembly operates to translate the steering wheel in a fore or aft direction relative to a vehicle operator. It will employ a suitable drive member, such as a rod, that may be operatively connected the steering shaft, such as by connecting with the column tube. For example, a suitable bracket or plate stop may connect the drive member (or threaded nut situated thereon) to the column tube. The column housing may have one or more slots or other cut-outs that receive the bracket (e.g., a longitudinal slot in a bottom portion of the column housing may expose the column tube). The drive member may be elongated. For example, it may be a rod. It may have threads. It may have teeth. It may have some other structure for meshingly engaging a gear or other drive mechanism associated with the motor of the telescoping motor sub-assembly. The drive member may include a suitable mechanism for limiting the amount of longitudinal travel. For example, it may include an internally threaded nut that is threadedly and adjustably mounted on a threaded portion of the drive member (e.g., a drive rod) that provides an adjustable stop to limit linear movement of the member.

When installed into the overall assembly of the present teachings, the telescoping motor subassembly may include a suitable structure for attaching to an energy absorption device, a bracket for the energy absorption device, a column housing or any combination thereof.

The teachings also envision employing at least one plastically deformable energy absorption device element (e.g., a strip or bend plate) adapted to be located within the steering column assembly (e.g., attached to or secured near the column tube) and being fixed in place to the column housing during normal operation for maintaining the steering column assembly in an operational position. The energy absorption device may have a free end. The free end may have a generally thinned portion and/or a T-shape. The free end, e.g., at the thinned portion, may be received within a notch of the column tube, with the T-shape extending into the column tube (e.g., between the column tube and the steering shaft). The energy absorption device may be an elongated metallic member. The energy absorption device may have at least one relatively flat surface (e.g., an elongated body portion). The energy absorption device may have a curved portion joining the elongated body portion and the free end (e.g., the end having a T-shape). The curved portion may cause an angle to be formed between the free end and the elongated body portion. The angle may be about 70 degrees or more, about 80 degrees or more, or about 85 degrees or more. The angle may be about 110 degrees or less, about 100 degrees or less, or about 95 degrees or less. For example, the free end and the elongated body portion may form an angle of about 90 degrees. The energy absorption device may be a metallic strip. Optionally the strip may have an elongated slot along at least a portion of its length. For example, a slot may be employed to receive a fastener, a tang or some other structure for securing the strip in the assembly. The energy absorption strip may be in a generally unwrapped state (e.g., where the strip is free of any portions that are generally parallel with each other in a U-shape) prior to deformation. The first end may be wrapped around only about 20 percent or less of the length of the elongated body portion. It may be advantageous to have a strip in a generally unwrapped, or minimally wrapped, state, as during manufacturing, forming a loop in the metal strip may be difficult, require additional resource or machinery, or may weaken the energy absorption strip, for example.

The energy absorption device may be dimensioned to be wider in cross-section than it is tall or thick (e.g., it may have a ratio of width to thickness of at least about 1.5:1, about 3:1, about 5:1, about 10:1, about 20:1, about 30:1 or higher). The energy absorption device element may have a generally continuous shape, thickness, and/or cross-sectional profile along its length. The energy absorption device element may have a varying shape, thickness, and/or cross-sectional profile along its length. It may have a bulbous free end (e.g., instead of or in addition to the T-shape). It may have a free end that has any shape capable of being secured within a column tube or a plate stop so it is not removed during an impact exceeding a threshold load (e.g., during a collapse stroke). The energy absorption device element may include a portion that includes or adjoins the free end that has a generally continuous shape and/or cross-sectional profile along a major portion of its length (e.g., about 50% or greater, about 65% or greater, or about 80% or greater). The energy absorption device may include an attachment end portion that differs in shape from the generally continuous shape and/or cross-sectional profile portion. The energy absorption device element may have a thickness of about 0.2 mm or greater, about 0.5 mm or greater or about 0.8 mm or greater. The energy absorption device element may have a thickness of about 5 mm or less, about 4 mm or less, or about 3 mm or less. The energy absorption device may be made of a steel (e.g., a plain carbon steel (such as SAE 1008, 1010 or otherwise), an alloy of steel that includes a metal in addition to iron, or otherwise).

In one aspect, the energy absorption device element may be such that the first end of the energy absorption device (e.g., which may have a T-shape, a generally bulbous shape, or other shape that resists pull out) is disposed within or carried on at least a portion of column tube. The column tube may include a notch or other opening for receiving a portion of the energy absorption device (e.g., a portion of the first end). For example, it may be such that upon translation of the column tube during an impact (e.g., a secondary impact), the energy absorption strip, leading with the first end, folds over itself (e.g., generally forming a U-shape). Deformation may be controlled via a guide structure located at or near the area where the column tube and the first end are joined. The guide structure may receive at least a portion the energy absorbing strip (e.g., the first end may be inserted through both the guide structure and the column tube), and upon a collapse stroke, the energy absorption strip may be pulled around the guide structure. Therefore, the guide structure may provide a controlled radius for the deformation of the energy absorption strip. The guide structure may be made of a material with sufficient compressive strength (e.g., so that it does not break as the energy absorption strip is wrapped around the structure). For example, the guide structure may be formed of Delrin, as it may yield but not break and/or may provide a consistent coefficient of friction. The guide structure may be backed up and/or supported by a plate stop (e.g., made of steel).

In another aspect, the elongated body portion of the energy absorption device element (e.g., the energy absorption strip) may be disposed within the column tube, and the first end of the energy absorption strip may extend out of the column tube and attach to a plate stop. The plate stop may be secured to the column tube (e.g., via one or more fasteners, such as rivets) and may be joined to the threaded nut of the telescoping subassembly to allow for adjustment of the column tube in a generally fore and aft direction. During a collapse stroke, the plate stop may shear off the column tube. The energy absorption strip may remain connected to the plate stop at the first end, and the elongated body of the energy absorption strip is caused to deform, as the column tube pushes on the strip, thereby causing the energy absorption strip to wrap, unwrap, or deform around the edge of the column tube.

In either of the configurations addressed, the telescope motor housing remains fixed, thereby allowing for an internal collapse of the column in a small packaging envelope as only the column tube and the energy absorption strip move during a collapse stroke.

During a secondary impact, upon attainment of a predefined load, the energy absorption device element may initially translate, elastically deform, and after a predefined load has been reached will begin plastic deformation (e.g., under a compressive force or a tensile force). Such plastic deformation is envisioned to contribute substantially to absorption of energy from the secondary impact. The energy absorption device element may be fastened at one or more locations along its length to another structure with the assembly (e.g., to the column tube, to the column housing, to the telescope motor subassembly, or otherwise).

The teachings herein also contemplate methods of making and/or installing the assemblies described. Thus, the elements as described may be assembled in a manner to achieve the described assembly. The teachings envision providing an assembly as described herein for installation into an automotive vehicle. For example, the teachings include attaching the bracket structure to a cross-vehicle beam, to an instrument panel or both. Such attaching may be for positioning the described bracket structure above or below the cross-vehicle beam and/or the instrument panel. The teachings envision providing for installation into an automotive vehicle (e.g., by attaching to a cross-vehicle beam, an instrument panel or both) an assembly in accordance with the present teachings.

The teachings also contemplate the methods that occur in operation of the assemblies described. For example, the teachings envision providing an assembly including a plastically deformable energy absorption device adapted to be housed at least partially within the column tube. In the event of an impact load to the steering shaft exceeding a predetermined impact load, the energy absorption device will yield plastically and absorb energy due to the impact load, with the telescoping motor subassembly remaining connected with the column housing.

Referring now to the figures, FIGS. 1-4 illustrate examples of the structure and operation of an electric reach and rake steering column assembly for a vehicle in accordance with the present teachings. The assembly has a tilt adjustment feature and a telescopic adjustment feature. As to each such feature, there are associated motors. However, it is possible that one of the motors may be omitted (e.g., it is possible that the tilt adjustment is achieved manually without a motor).

Figure 1:
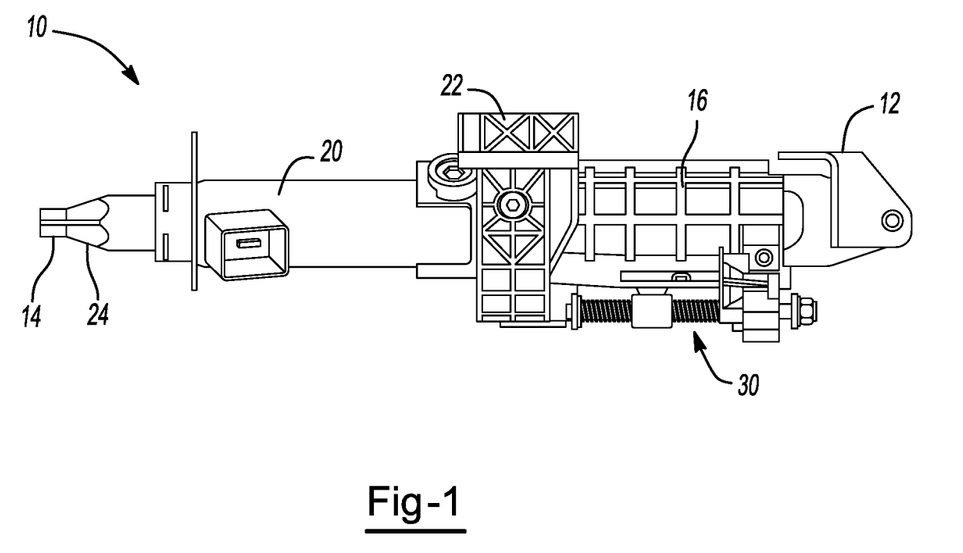
FIG. 1 illustrates a side view of a steering column assembly in accordance with the present teachings.

FIG. 1 illustrates an exemplary steering column assembly 10 having a forward end 12 and a rearward end 14. The steering column assembly 10 includes a column housing 16 that supports a column tube 20 and a steering shaft 24. The steering shaft 24 is adapted for supporting a steering wheel (not shown) and is permitted to rotate as the steering wheel is rotated. The column tube 20 is mounted for linear telescopic movement within the column housing 16. This telescopic movement is achieved through a telescoping subassembly 30. A bracket structure 22 assists in mounting the steering column assembly 10 within a vehicle. The bracket structure 22 may also at least partially support a tilt adjustment subassembly, allowing the tilt adjustment of the steering shaft 24, column tube 20, column housing 16, or a combination thereof.

Figure 2:
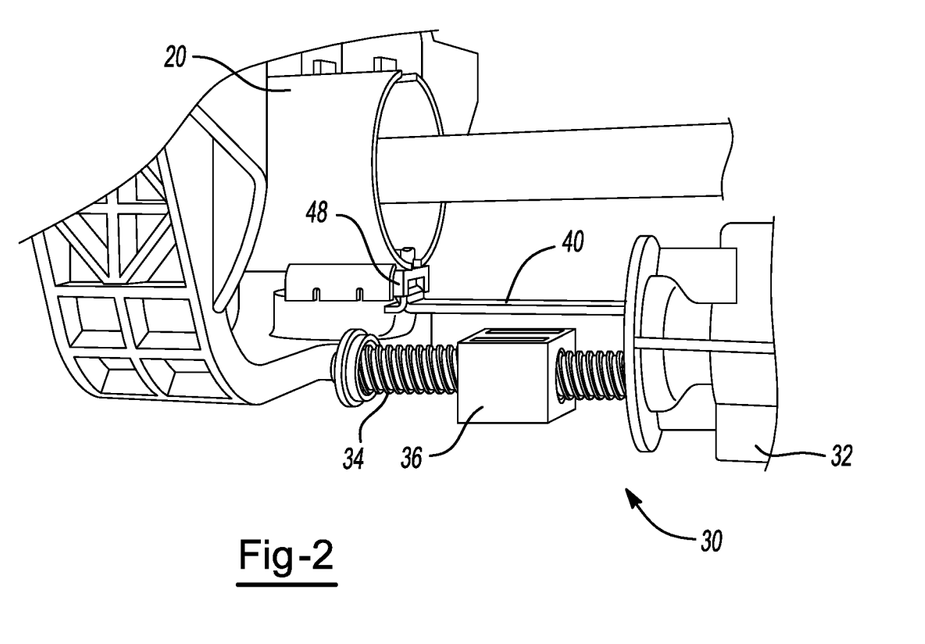
FIG. 2 illustrates an energy absorption device within a steering column assembly in accordance with the present teachings.

FIG. 2 illustrates an energy absorption strip 40 and telescoping subassembly 30 in accordance with the present teachings. To provide a view of the energy absorption strip, the column housing has been omitted. The steering column assembly includes a telescoping subassembly 30, which includes a drive member 34 shown as a threaded rod. The drive member 34 is driven by an actuator device 32, such as an electric motor, which may be housed within the column housing or another structure attached to the column housing. A threaded nut 36 may move in a generally linear fashion along the drive member 34. A plate stop 38 or other structure (omitted here for clarity, but see FIG. 4) may join the threaded nut and the column tube 20 so that when the nut 36 translates along the drive member 34, the column tube 20 also translates in a fore or aft direction, thereby providing the telescoping adjustment to the steering column assembly. An energy absorption strip 40 is secured to the column housing 20 via an optional guide structure 48 and is adapted to absorb energy by deforming when the column tube 20 translates forward during a collapse stroke, such as upon a secondary impact.

Figure 3:
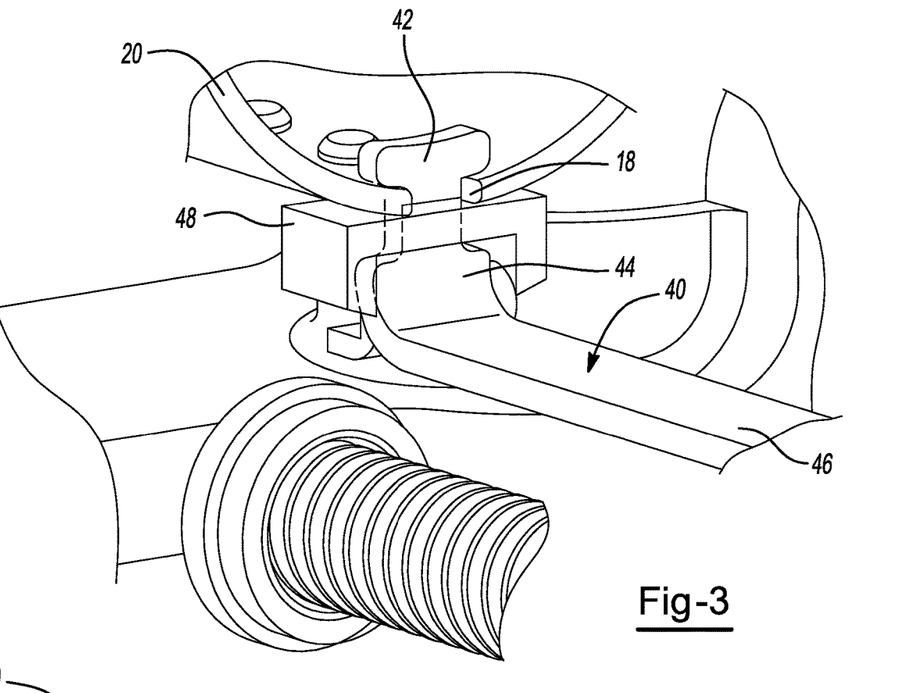
FIG. 3 illustrates an enlarged view of an energy absorption device and the column tube in accordance with the present teachings.

FIG. 3 illustrates an enlarged view of the energy absorption strip 40. The energy absorption strip 40 includes a first end 42 that has a thinned portion and a T-shape. The energy absorption strip includes a curved portion 44, which joins the elongated body 46 of the energy absorption strip 40 with the first end 42. The first end 42 of the energy absorption strip 40 is received within a notch 18 in the column tube 20, and the T-shaped portion extends into the column tube. Prior to any deformation of the energy absorption strip 40, the angle formed between the first end 42 and the elongated body 46 is about 90 degrees±about 10 degrees. During a collapse stroke, where the column tube translates forward upon reaching a threshold load, the column tube pushes the energy absorption strip forward, causing it to bend or fold on itself to form a general U shape. A guide structure 48 may be located at or near the notch 18 of the column tube and may serve to guide the deformation of the energy absorption strip 40 during a collapse stroke. The guide structure 48 may include an opening that receives a portion of the energy absorption strip 40, and the energy absorption strip may generally travel through the guide structure (e.g., be pulled through) and fold over the guide structure during the deformation of the energy absorption strip when absorbing energy. A benefit of the present assembly is that the telescoping subassembly may remain fixed within the assembly, even during a collapse stroke.

Figure 4:
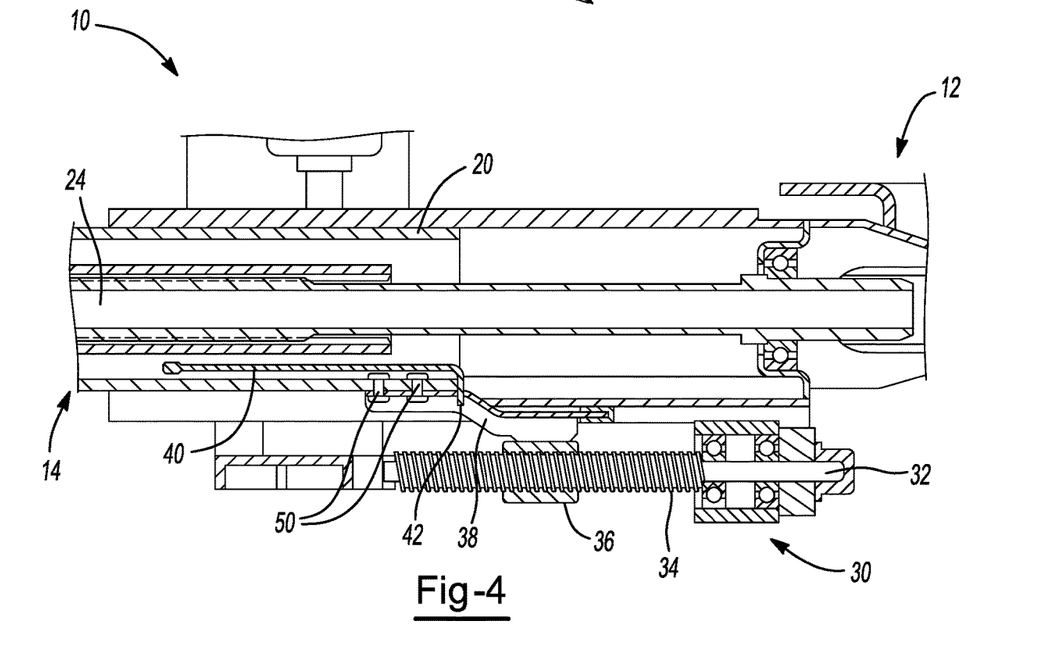
FIG. 4 illustrates an assembly of the energy absorption device within a steering column assembly.

FIG. 4 illustrates another configuration of the energy absorption strip 40 within the steering column assembly 10. The assembly 10 has a forward end 12 and a rearward end 14. A telescoping subassembly 30 including a drive member 34, driven by an actuator device 32, such as an electric motor, which causes a threaded nut 36 to translate along the length of the drive member 34. The plate stop 38 joins the threaded nut 36 to the column tube 20, thereby allowing the column tube 20 to translate fore and aft during telescope adjustment through the telescoping subassembly 30. The plate stop 38 is attached to the column tube 20 via rivets 50, though other methods of attachment are possible. An energy absorption strip 40 is disposed within the column tube 20 (e.g., between the column tube and the steering shaft 24). The energy absorption strip 40 has a first end 42 that extends out of the column tube 20 (e.g., forming an angle of about 90 degrees±about 10 degrees) and the first end is attached to or engages with the plate stop 38 and is held in place. During a collapse stroke, the rivets 50 shear and the column tube 20 translates forward, toward the forward end 12 of the steering column assembly. The telescoping subassembly 30, particularly the telescoping actuator device, such as an electric motor, is able to remain fixed, while the energy absorption strip 40 is forced to deform as it is pushed by the column tube 20. The first end 42 of the energy absorption strip 40 remains held by the plate stop 38, and the energy absorption strip 40 is forced to deform, due to the column tube 20 pushing on the energy absorption strip, causing it to fold onto itself.

As seen from the above, collapse of a steering column assembly is possible without reliance upon friction as the primary mode of energy absorption. Rather, the teachings herein rely primarily upon plastic deformation for absorbing energy from secondary impact. It is thus possible that reliance upon friction may be at most incidental, as compared with reliance upon plastic deformation. Energy absorption may be essentially free of reliance upon friction. Collapse of a steering column assembly is possible without reliance upon wires as a form of an energy absorption device. The energy absorption device may be a structure that is not a wire. Further, though energy absorption is as a result of plastic deformation of the energy absorption devices described herein, such plastic deformation may be deformation that occurs without any permanent elongation of the energy absorption device.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of, or even consisting of, the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

Relative positional relationships of elements depicted in the drawings are part of the teachings herein, even if not verbally described.

What is claimed is:

1. A steering column assembly comprising:
   a. a column tube;
   b. a steering shaft supported for rotation at least in part by the column tube and having a longitudinal axis;
   c. a telescoping motor subassembly adapted for selectively driving the steering shaft, the column tube, or both, in a fore or aft direction generally along the longitudinal axis; and
   d. an energy absorption strip comprising:
      i. a generally elongated body portion;
      ii. a first end; and
      iii. a curved portion joining the first end and the generally elongated body portion that forms an angle between the first end and the generally elongated body portion;
   wherein the energy absorption strip is carried within the steering column assembly;
   wherein the energy absorption strip is in a generally unwrapped state;
   wherein the first end of the energy absorption strip has a shape that engages with a notch of the column tube and resists pull out to retain the first end of the energy absorption strip within the column tube;
   wherein the energy absorption strip is adapted to be deformed as a result of the translation of the column tube during the impact exceeding the threshold load; and
   wherein the telescoping motor subassembly remains generally fixed during the impact.

2. The steering column assembly of claim 1, wherein the angle between the first end and the generally elongated body portion is about 80 degrees or greater and about 100 degrees or less.

3. The steering column assembly of claim 1, wherein the energy absorption strip is adapted to be folded over itself during translation of a column tube during the impact.

4. The steering column assembly of claim 1, wherein the energy absorption strip is a metal strip.

5. The steering column assembly of claim 1, further comprising a tilt subassembly that is adapted for selectively raising or lowering the steering shaft, the column tube, or both.

6. The steering column assembly of claim 1, wherein the first end of the energy absorption strip has a thinned portion that is received within the notch of column tube.

7. The steering column assembly of claim 6, wherein the energy absorption strip is further held in place by a guide structure.

8. The steering column assembly of claim 7, wherein the energy absorption strip is adapted to be folded over itself during translation of the column tube during the impact.

9. The steering column assembly of claim 1, wherein the shape of the first end of the energy absorption strip that resists pull out is a T-shape.

10. The steering column assembly of claim 9, wherein the energy absorption strip is further held in place by a guide structure.

11. The steering column assembly of claim 1, wherein the deformation of the energy absorption strip is guided by a guide structure around which the energy absorption strip wraps during the impact.

12. The steering column assembly of claim 11, wherein the guide structure is formed of a material that provides a consistent coefficient of friction and/or has sufficient compressive strength that does not break when the energy absorption strip wraps around the guide structure.

13. The steering column assembly of claim 11, wherein the energy absorption strip is adapted to be folded over itself during translation of a column tube during the impact.

14. The steering column assembly of claim 1, wherein the elongated body portion of the energy absorption strip is located within the column tube, and the first end extends out of the column tube and is secured to a plate stop within the assembly.

15. The steering column assembly of claim 14, wherein the plate stop is attached to the column tube, and wherein during the impact, the plate stop shears off the column tube and the first end of the energy absorption strip remains secured to the plate stop, causing the elongated body portion to deform.

16. The steering column assembly of claim 15, wherein the energy absorption strip is adapted to be folded over itself during translation of a column tube during the impact.

17. The energy absorption strip of claim 14, wherein the energy absorption device has a T-shape at the first end that is adapted to engage with the column tube or the plate stop of a steering column assembly.

18. The energy absorption strip of claim 17, wherein the energy absorption strip is adapted to be folded over itself during translation of a column tube during the impact.

* * * * *